US008508167B2

(12) United States Patent
Barkau et al.

(10) Patent No.: US 8,508,167 B2
(45) Date of Patent: Aug. 13, 2013

(54) ACTUATION DEVICE

(75) Inventors: Rene Barkau, Ostercappeln-Venne (DE); Heiko Schnier, Bad Essen (DE)

(73) Assignee: Kesseböhmer Holding E.K., Bad Essen (DE)

( * ) Notice: Subject to any disclaimer, the term of this patent is extended or adjusted under 35 U.S.C. 154(b) by 229 days.

(21) Appl. No.: 12/919,224

(22) PCT Filed: Feb. 24, 2009

(86) PCT No.: PCT/EP2009/001303
§ 371 (c)(1),
(2), (4) Date: Oct. 29, 2010

(87) PCT Pub. No.: WO2009/106292
PCT Pub. Date: Sep. 3, 2009

(65) Prior Publication Data

US 2011/0198975 A1 Aug. 18, 2011

(30) Foreign Application Priority Data

Feb. 25, 2008 (DE) ........................ 10 2008 010 768

(51) Int. Cl.
*H02P 1/00* (2006.01)
*H02P 3/00* (2006.01)

(52) U.S. Cl.
USPC . 318/445; 318/480; 340/539.22; 340/539.21; 340/540; 340/5.2; 312/221; 312/348.3; 221/3

(58) Field of Classification Search
USPC ............... 49/31, 262, 70, 118, 334, 139, 264, 49/349; 312/319.1, 294, 270.1, 221, 348.3; 340/539.22, 539.21, 540, 5.2; 318/445, 480; 331/65; 221/3
See application file for complete search history.

(56) References Cited

U.S. PATENT DOCUMENTS

| | | | | |
|---|---|---|---|---|
| 5,020,868 | A * | 6/1991 | Brunnert | 312/319.1 |
| 6,752,005 | B2 * | 6/2004 | Harada et al. | 73/35.13 |
| 7,693,603 | B2 * | 4/2010 | Higham | 700/242 |
| 2006/0147051 | A1 * | 7/2006 | Smith et al. | 381/71.2 |
| 2007/0228888 | A1 * | 10/2007 | Satou et al. | 310/338 |
| 2007/0263856 | A1 * | 11/2007 | Parsa | 379/413.04 |

FOREIGN PATENT DOCUMENTS

| | | | |
|---|---|---|---|
| DE | 202007006818 | * | 10/2007 |
| DE | 202007006818 | U1 | 10/2007 |
| WO | 2005/079630 | | 9/2005 |
| WO | 2006/017863 | | 2/2006 |

* cited by examiner

*Primary Examiner* — Rita Leykin
(74) *Attorney, Agent, or Firm* — Gudrun E. Huckett

(57) ABSTRACT

The invention relates to an actuation device for pull-outs, shelf boards, flaps, or other such elements to be opened, particularly front elements of particularly kitchen and office furniture, kitchen appliances and flush-mounted appliances, product dispensing devices, and the like, having components comprising a corpus, wherein the element to be opened can be transferred into an open position relative to the corpus 2 by way of a drive unit 5, the drive unit 5 can be activated by way of control means, and the control means comprise a front body sound sensor 6 that is associated with the front element 3. In order to create an actuation device, the front surface of which is to be configured in a manner that is free of impairment, the control means have a second corpus body sound sensor 7 (solid body sound sensor) that is disposed at a distance from the front body sound sensor 6 in or on the corpus interior 4, wherein the corpus sound signals of the front body sound sensor 6 and of the corpus body sound sensor 7 can be compared to each other in an analysis unit of the control means, and the drive unit 5 can be activated by way of the control means as a function of the result of the signal comparison.

22 Claims, 21 Drawing Sheets

ACTUATION DEVICE

BACKGROUND OF THE INVENTION

The invention relates to an actuation device for pull-out devices, shelf boards, flaps or similar elements to be opened, in particular front elements, especially of kitchen furniture and office furniture, kitchen appliances and built-in kitchen appliances, product dispensing devices and similar components comprising a corpus, wherein the element to be opened is moveable by a drive unit relative to the corpus into an open position, the drive unit is activatable by control means, and the control means are provided with a front body sound sensor correlated with the front element.

WO 2006/017863 A1 discloses an actuation device for a pull-out device of a piece of furniture with a switch as control means that is arranged on the front element, for example, a front panel of a furniture pull-out device, for example, in the form of a pull-out storage unit. Also, it is possible to provide such control means on a door of a cabinet that contains a shelf board that is to be moved out, for example, from a corner cabinet. In such a piece of furniture, pull-out devices, shelf boards and the like are to be moved motorically into their open position, so that objects placed thereon can be gripped by an operator. It is a disadvantage in this connection that such a switch affects the overall appearance of a furniture front face.

DE 20 2007 006 818 U1 discloses a cabinet with one or several pull-out devices that can be moved by means of a motor drive out of the interior of the cabinet. For this purpose, an actuation device is provided that is activatable by control means that comprise a room microphone as well as a sound sensor for sound traveling through a body. The control means detect a body sound signal as well as a signal that is received through the room microphone. For this purpose, an operator is to knock on the front of the cabinet, for example, and this is detected by the body sound sensor arranged behind the front panel and an appropriate signal is passed on to the control unit. The room microphone is oriented in the direction of the front panel so that the signal also triggers sound waves that are detected with corresponding time delay by the room microphone. Based on the time interval the control unit is supposed to determine afterwards whether the signal in question is a knocking signal for activating the motoric drive for opening the cabinet or a false signal.

It is disadvantageous in this connection that, based on the combination of the body sound signal and the room microphone, knocking commands cannot be processed in a sufficiently dependable way. In particular, it is disadvantageous, that the necessary operating time and response time are considerable. Besides, disturbing noises may also trigger airborne sound waves that cause operating errors.

It is the object of the present invention to further develop an actuation device of the aforementioned kind in such a way that by means of a knocking signal the actuation device is to be activated in an operator-friendly manner and, moreover, operating errors can be precluded as much as possible.

SUMMARY OF THE INVENTION

For solving this object the actuation device is characterized in that the control means comprise a second corpus body sound sensor (solid body sound sensor) that is arranged in or on the corpus at a spacing to the front body sound sensor, wherein the body sound signals of the front body sound sensor and of the corpus body sound sensor are comparable with each other in an evaluation unit of the control means and the drive unit is activatable as a function of the result of the signal comparison by means of the control means. Concerning additional advantageous embodiments, reference is being had to the dependent claims.

Accordingly, an actuation device is made available in which the control means comprise two body sound sensors (solid body sound sensors) wherein one is assigned to the front element and the other to the corpus, for example, an inner wall of a furniture corpus or, for example, an outer wall of a kitchen appliance. Such body sound sensors—often also referred to as knocking sensors—can react to impacts or knocking signals or vibrations at the front element and are to be arranged in a hidden arrangement, for example, behind a front panel. To avoid false releases, for example, on account of other vibrations occurring in a room, for example, as a result of footstep sound on e.g. board floor, sounds caused by a dishwasher and the like, a further body sound sensor is provided that has a different sensor orientation than the front body sound sensor provided on the front panel. The latter has a sensor orientation toward a person standing in front of the front element and is therefore oriented transverse to a front panel surface. The body sound sensor of the corpus is oriented at another angle relative to the sensor orientation of the front body sound sensor, preferably at about 90°, so that it reacts to noises caused in corpus interior or also by other sites in the room or by other machines, or by noises caused by people so that different sound signal levels are generated at the front body sound sensor and the corpus body sound sensor. In the evaluation unit these levels are compared with each other and evaluated with the aid of a signal database stored therein so that it can be reliably determined whether a knocking signal and thus a body sound signal at the front body sound sensor is present that demands an opening action by the operator and therefore represents a command signal. When a person knocks on the front, this signal is detected immediately and directly passed on. When no other signal, caused e.g. by a false noise, is present at the body sensor, the drive is activated, because on account of the different orientation, the corpus sensor does not detect or only minimally detects the knocking signal. When this command signal is present, a signal is generated in turn by the evaluation unit, so that by means of the control means the drive unit is activated to open the front panel with correlated pull-out device, shelf board and the like, a door panel of a dishwasher or the like. Thus, the actuation device can be activated exceptionally quickly, safely and sensitively.

Moreover, the sensitivity of the body sound signals is to be adjustable so that footstep sound signals and the like are eliminated initially in a wide range.

However, by providing the second body sound sensor a high degree of reliability exists, so that false releases are nearly excluded. Accordingly, an actuation device is provided that enables in a functionally reliable way a motoric opening of the front element with the pull-out device, the shelf board or the like; however, this does not affect its outer appearance.

Preferably, the body sound signal or knocking signal generated at the front element is transmitted wirelessly by radio control means to the evaluation unit. The latter can then transmit the signal that has been determined on account of the signal comparison of the front body sound signal with the corpus body sound signal again wirelessly to the drive unit, but also by means of a cable connection to the drive unit, which then moves the front element together with the pull-out device into the open position in case of a detected opening knocking signal.

When this open position is reached, a piece of furniture is favorably designed such that the connection between an adjusting means of the drive unit and the front element is decoupled and the adjusting means of the drive unit is moved back into a starting position. Thereafter, the front element together with its pull-out devices is to be moved by hand into the closed position. Because pieces of furniture are often provided with pull-out devices that are to be extended by telescoping elements that require a synchronization of the telescoping parts, at least at certain distances, it is to be provided for such a piece of furniture in accordance with the invention, that upon retraction of the adjusting means the latter will again assume, with the pull-out device still being open, a slightly extended waiting position and in this position will wait for the pull-out device to be closed or the front element to be closed. When the front element with its pull-out device is closed, it reaches from a certain closing travel on a position where the adjusting means is waiting for the front element with the pull-out device. In this waiting position the adjusting means engages the front element and moves it with the help of the drive unit into its final closing position while at the same time also the telescoping parts of the pull-out device are synchronized. For this purpose, an actuator is provided preferably on the front panel.

The control means comprise a reciprocatingly arranged triggering unit that is moved by the actuator during the closing movement of the front panel from a neutral position into a switching position. After reaching the switching position, the coupling members on the adjusting means and the adjusting means are activated such that they grip the front cover and move it by means of the drive unit into the final closed position. As a result of the motoric closing action slip is moreover eliminated. Once the front element has reached its final closed position, it is decoupled again from the adjusting means, so that afterwards, in addition to motoric opening action, also a manual pulling action is enabled.

BRIEF DESCRIPTION OF THE DRAWINGS

Other advantages and configurations of the invention result from the following embodiments and the drawing. The drawings show in.

DESCRIPTION OF PREFERRED EMBODIMENTS

Figure 1:
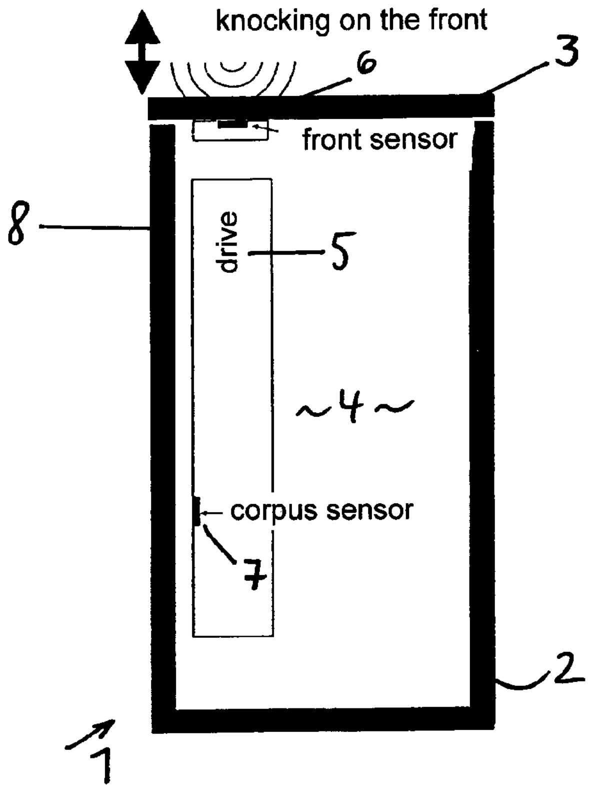
FIG. 1 schematically a plan view of an embodiment of a piece of furniture with "knocking on the front" feature.

In the drawing, same-acting parts are principally provided with same reference numerals.

Figure 2:
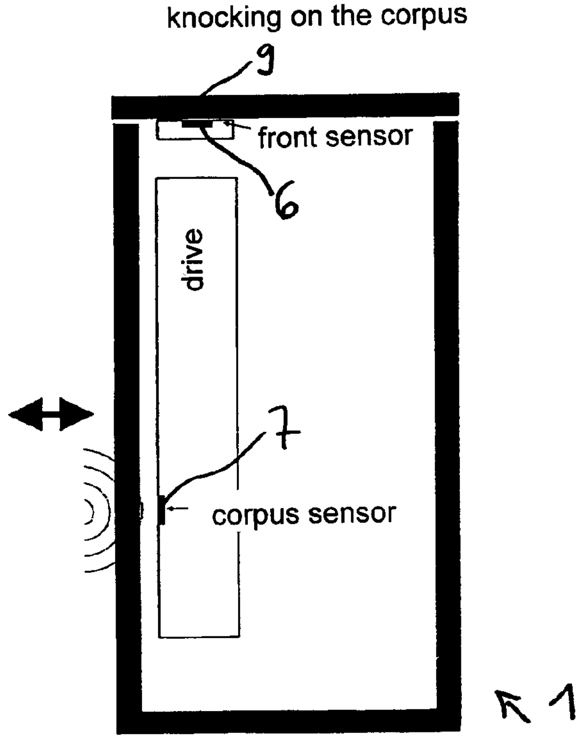
FIG. 2 schematically a plan view of an embodiment of a piece of furniture with "knocking on the corpus" feature.

In the FIGS. 1 and 2 a cross section representation shows in a general schematic view a piece of furniture according to the invention. In the shown embodiment the piece of furniture is meant to be a tall cabinet with a furniture corpus 2 and a front element 3 that is adjoined by a pull-out device, not illustrated in detail, in the interior 4 of the furniture corpus. It is to be supported on telescopic rails and by means of a drive 5 is to be moved into its open position. In the illustrated embodiment two sensors are shown, i.e., a front body sound sensor 6 and a corpus body sound sensor 7. The front body sound sensor is embodied as a radio sensor that sends its signals to a receiver from where the signal is supplied to control means, not shown in detail. The control means also receive the reference signal of the corpus body sound sensor 7. This also can be accomplished wireless, but also by conductors. In the evaluation unit of the control means the signals are compared and, as a function of the results of the signal comparison, the drive is activated for opening the front element 3, as will be explained in more detail in the following.

In FIG. 1 a situation is illustrated where an operator knocks on the front element 3. When doing so, body sound signals are generated that are directed in the direction of the arrows 8 while in the embodiment of FIG. 2 a situation is illustrated where knocking occurs on the corpus, i.e., knocking on the side of the corpus 2, which generates sound waves in the direction of the arrow 9. The vibrations that are thus received at the sensors impinge in case of knocking on the front directly on the front body sound sensor 6, while in case of the corpus body sound sensor 7 the vibrations run parallel, so that the oscillation or signal levels are very different, because the corpus body sound sensor 7 is oriented basically perpendicularly to the length of the front element 3 and insofar is basically oriented at a right angle to the front body sound sensor 6.

When knocking on the furniture corpus 2 (FIG. 2), the corpus body sound sensor 7 picks up of the lateral impacts or the lateral vibrations with greatest possible sensitivity because the vibrations impinge directly perpendicularly. On the other hand, the front body sound sensor 6 is positioned parallel to the impinging vibrations and this ensures greatest possible safety against false release because the evaluation unit of the control means determines and recognizes these different vibrations levels. As sensors, piezo sensors are considered. The front body sound sensor 6 is arranged behind the decorative surface of the front element 3 and is therefore not visible from the exterior.

Figure 3:
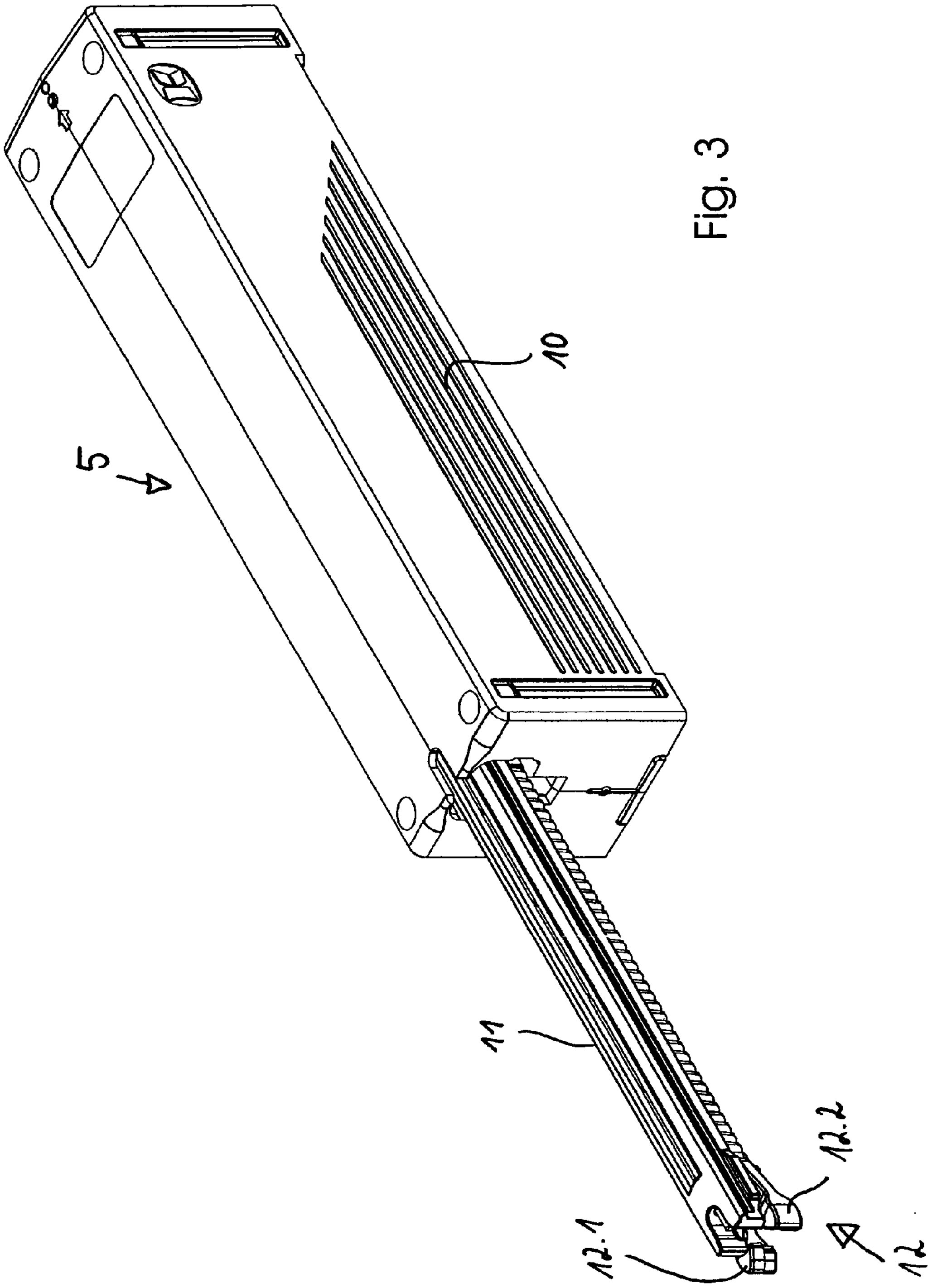
FIG. 3 an embodiment of a motoric drive with extended adjusting means in a perspective representation.
Figure 4:
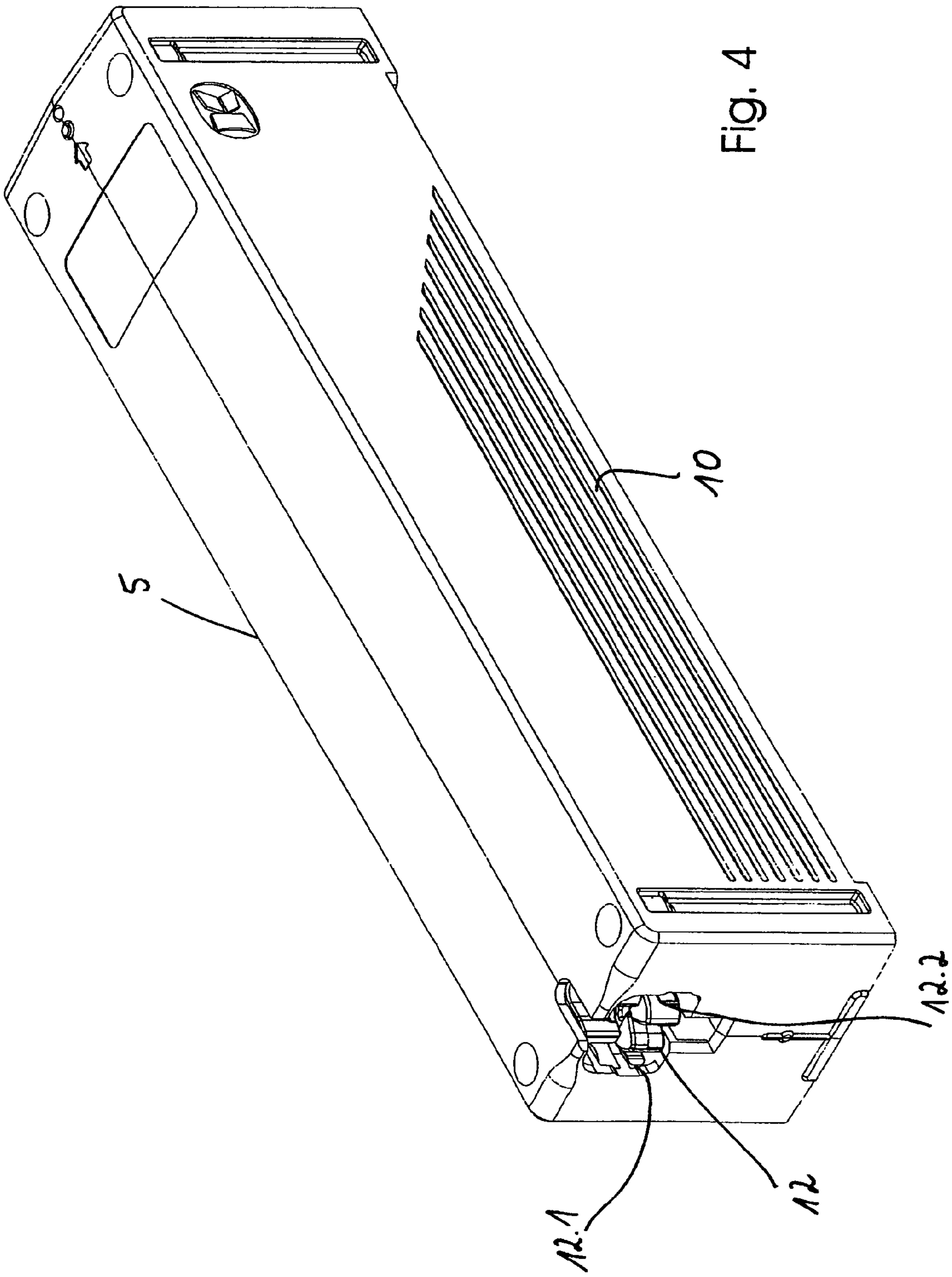
FIG. 4 the embodiment of FIG. 3 in the retracted state of the adjusting means.
Figure 5:
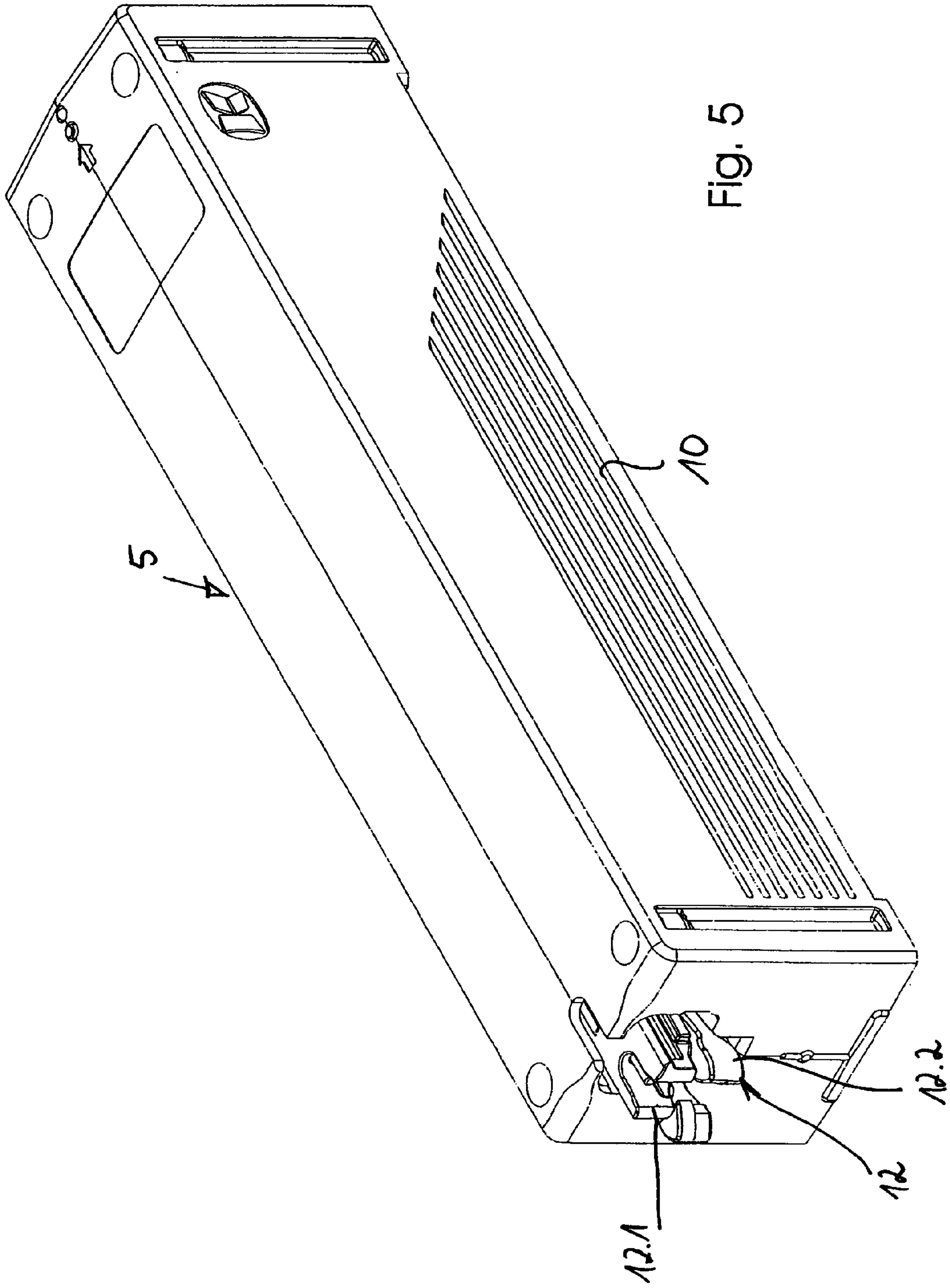
FIG. 5 the embodiment of FIGS. 3 and 4 in the waiting position of the adjusting means in a perspective representation.

In the FIGS. 3 to 5, the drive unit 5 with the adjusting means 11 is illustrated in more detail. The drive unit 5 has a housing 10 and as an extendable adjusting means 11 a toothed rack element. In the front end area the adjusting means 11 has a coupling member 12 with two fork claws 12.1 and 12.2 that can be opened and closed in a fork-shape, namely against the force of a spring. When the adjusting means 11 is retracted into the housing 10, the fork claws 12.1 and 12.2 glide within a guide provided therein and can be closed. The drive unit 5 is activated by the control means, not shown in detail, and the result of the comparison of the received and evaluated body sound signals. In FIG. 3, the adjusting means 11 are shown in the extended state, and in FIG. 5 in the retracted state, however, in a waiting position that is assumed in order to wait for the pull-out device to be pushed in by hand in such a way that at the end of its closing movement, for the purpose of elimination of slip, it can still be gripped by the fork claws 12.1 and 12.2 in order to be moved into its final position.

This waiting position is assumed after the front element 3 or the pull-out device has been moved by means of the adjusting means 11 and the drive unit 5 into the completely open final position, whereupon the fork claws 12.1 and 12.2 are released and the adjusting means 11 moves into its rearward final position situated in the housing (FIG. 4) reaches. When this final position is reached, the waiting position, illustrated in FIG. 5, is realized by means of the control means 11 and the drive unit 5.

Figure 6:
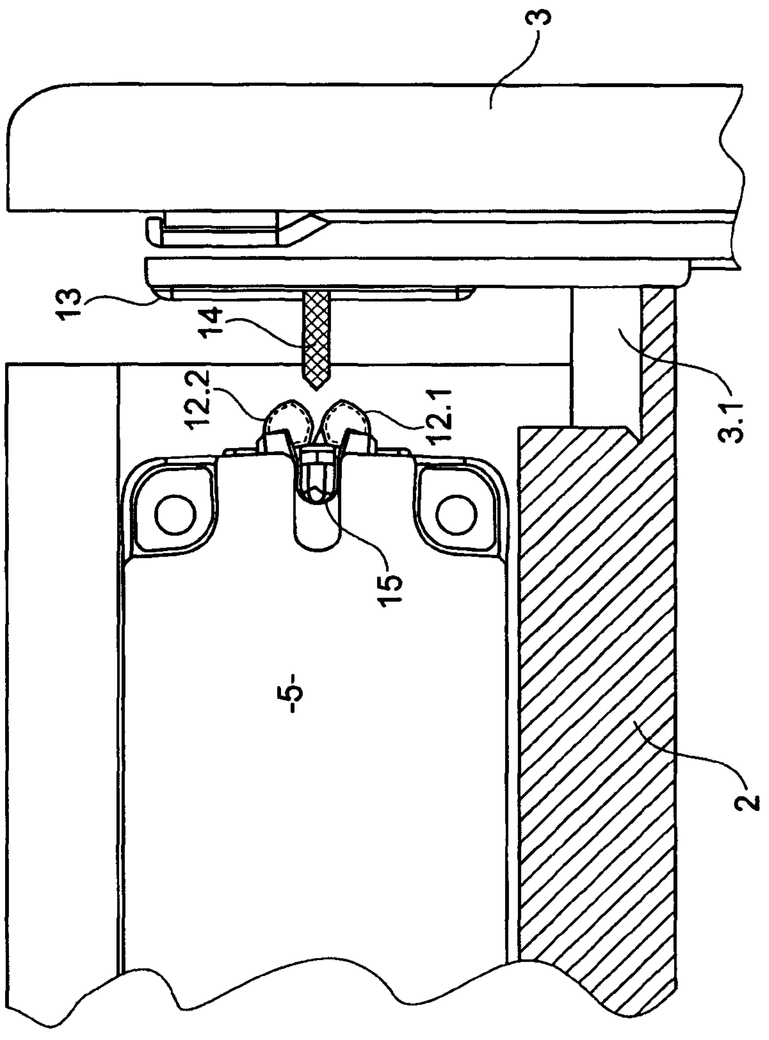
FIG. 6 in a plan view the embodiment of FIG. 5 in the waiting position.
Figure 7:
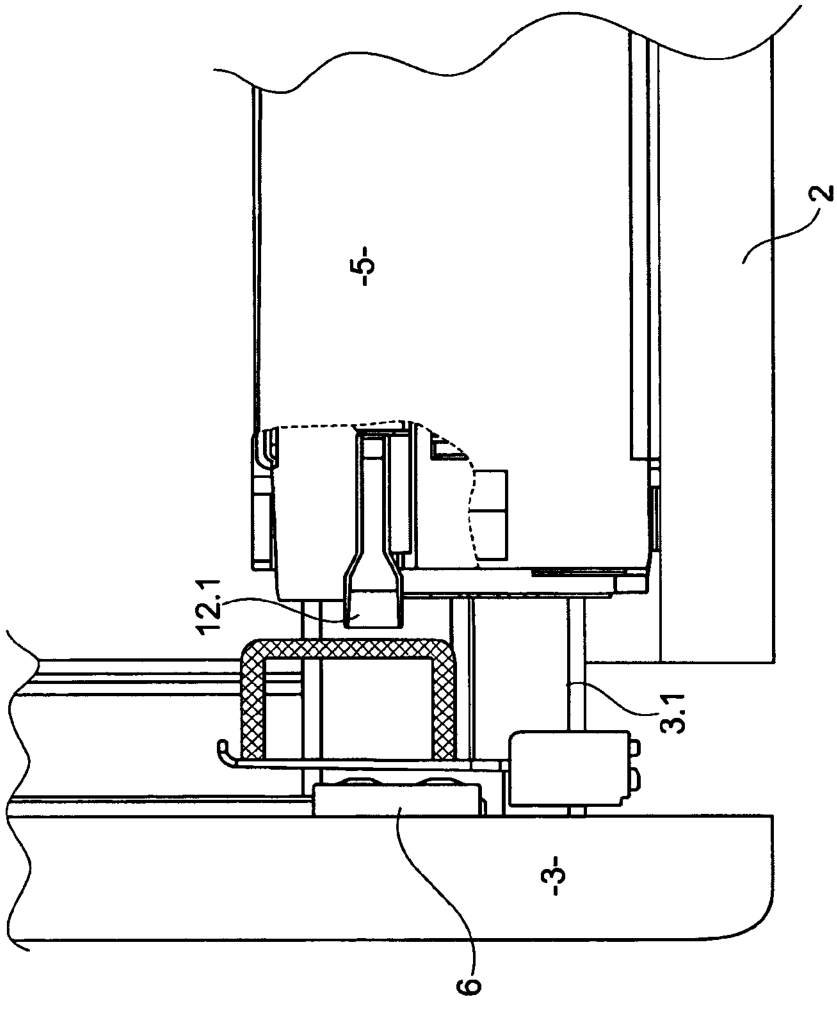
FIG. 7 the embodiment of FIG. 5 in a side view in the waiting position.
Figure 8:
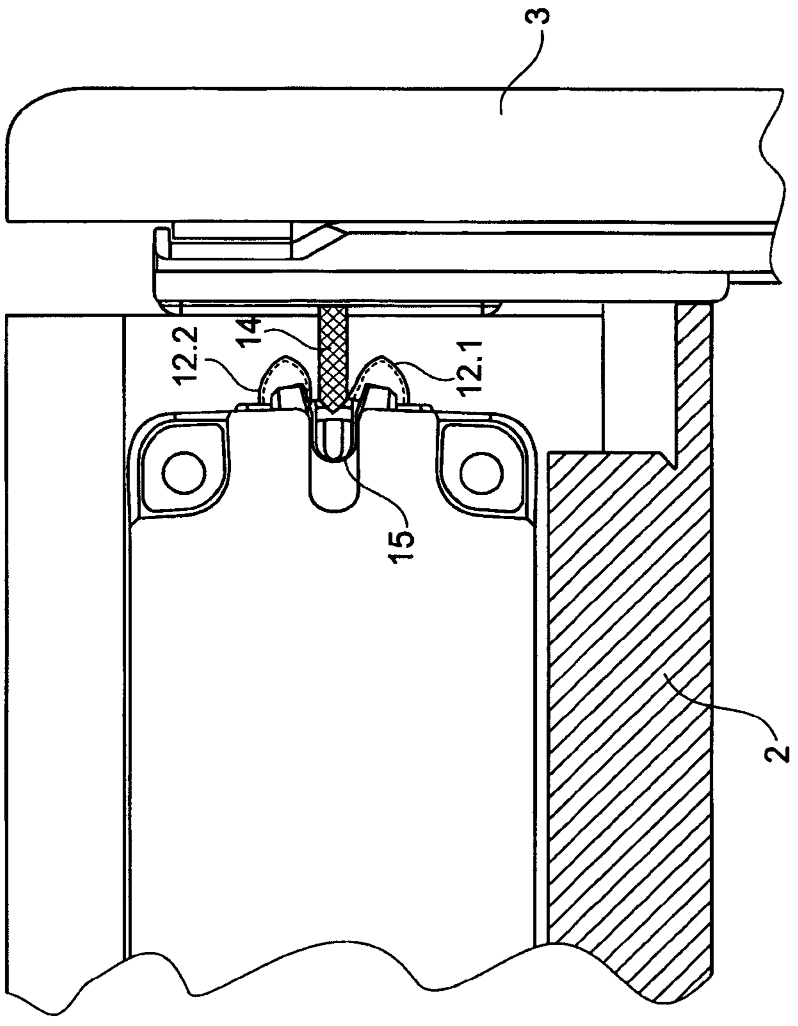
FIG. 8 the embodiment of FIG. 5 in the position "insertion of the adjusting means"
Figure 9:
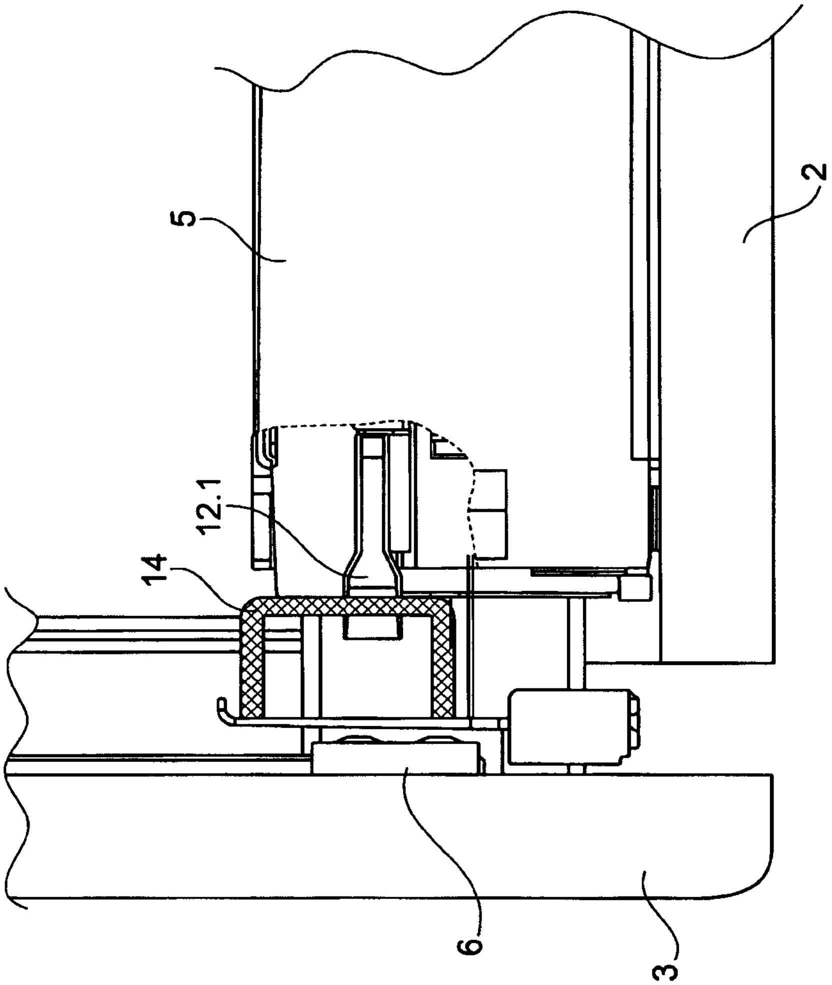
FIG. 9 the embodiment of FIG. 8 in a side view.

The FIGS. 6 and 7 show in detail views the furniture with front element 3 and drive 5, in a plan view and in a side view, respectively, namely in the waiting position according to FIG. 5. In FIG. 6 the furniture corpus 2 is shown to which the drive 5 is screwed. Also shown is the front element 3 with the front body sound sensor 6 and on the back of the front element 3 there is a grip or bracket 13 that can be engaged by the fork claws 12.1 and 12.2. On the front element there is also an actuator 14 that can move between the fork claws 12.1 and 12.2 during a closing movement of the front element 3 and of the pull-out device 3.1 connected thereto and can thereat impinge on a triggering unit that is identified by reference numeral 15 in the embodiment and is embodied as a spring-loaded reciprocating switching rod.

In analogous representation to FIGS. 6 and 7, FIGS. 8 and 9 show a state, respectively, where the front element 3 together with the pull-out device has been moved manually toward the furniture corpus 2 in a position shortly before reaching the final closed position during its closing movement and where the actuator 14 connected to the front element 3 has been moved between the fork claws 12.1 and 12.2 and is shortly before contacting the switching rod 15.

Figure 10:
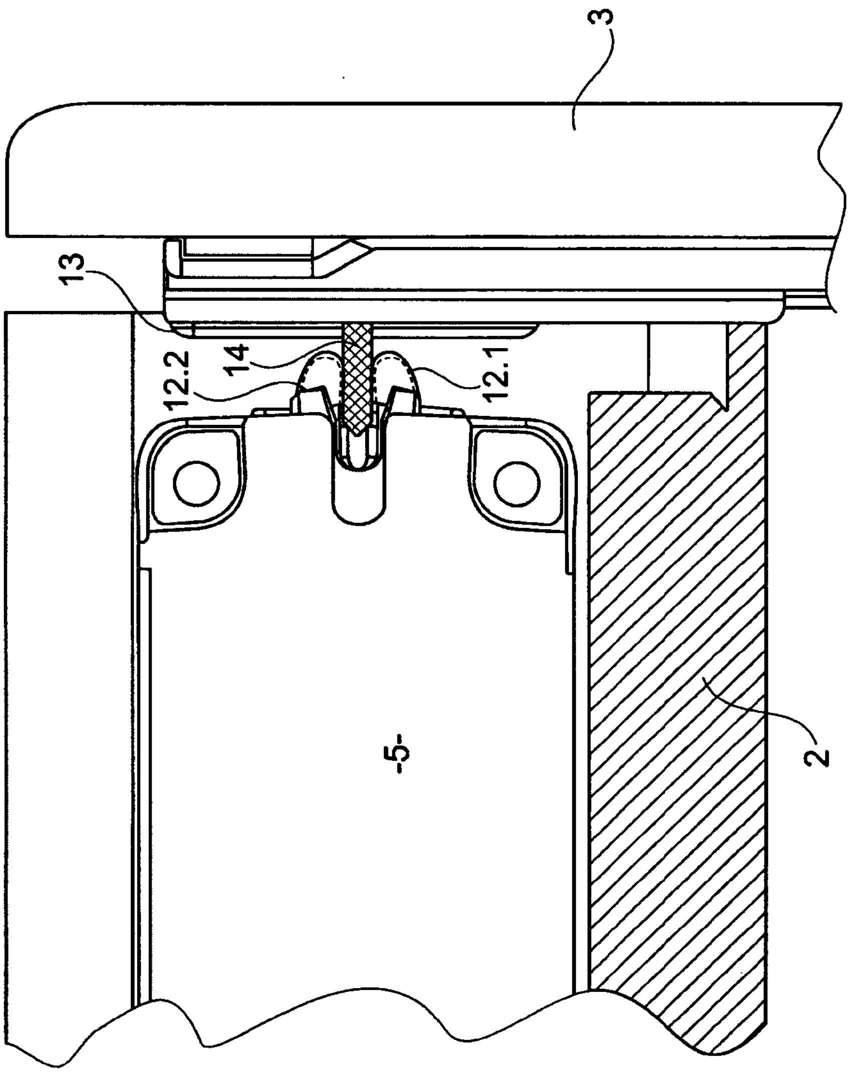
FIG. 10 an analogous representation to FIG. 8 in a plan view in the inserted state and with actuated adjusting means, FIG. 11 an analogous representation to FIG. 10 in the state "motorically closing" to eliminate slip, FIG. 12 an analogous representation to FIG. 13 with released drive in the state "decoupled", FIG. 13 an analogous representation to FIG. 12 in the state of "manual pullout", and FIG. 14 an analogous representation to FIG. 13 with decoupled front element for "further manual pullout"
Figure 11:
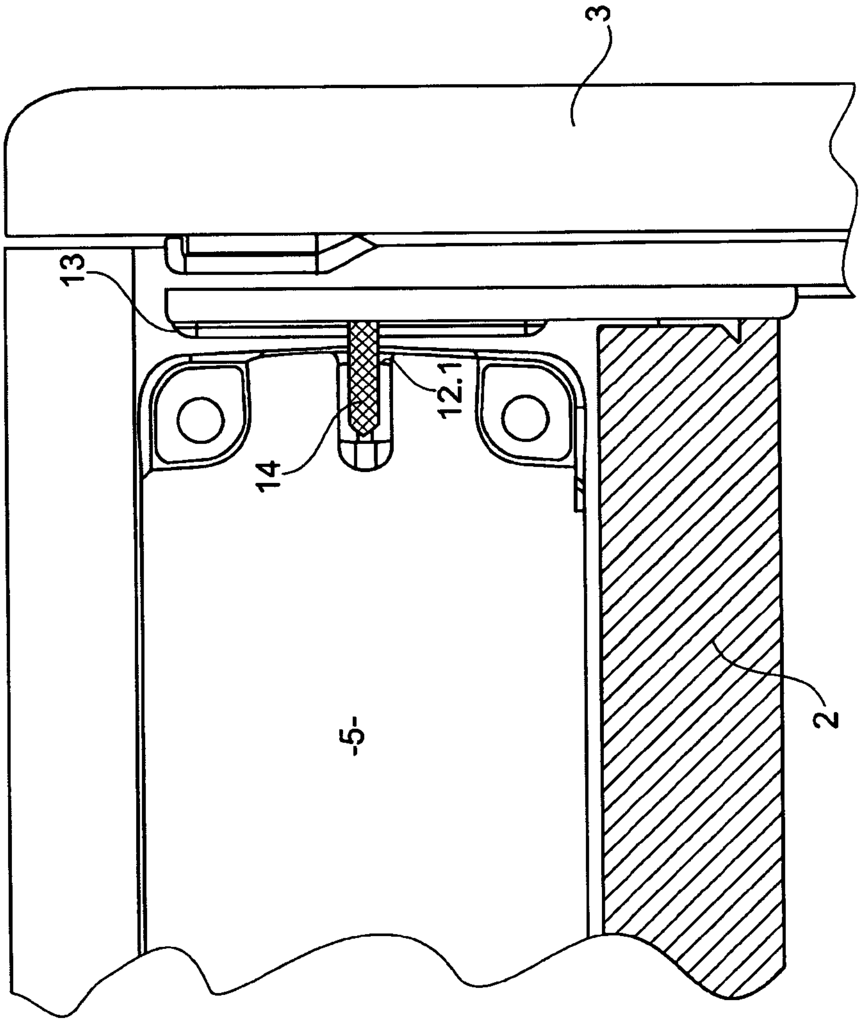
Figure 12:
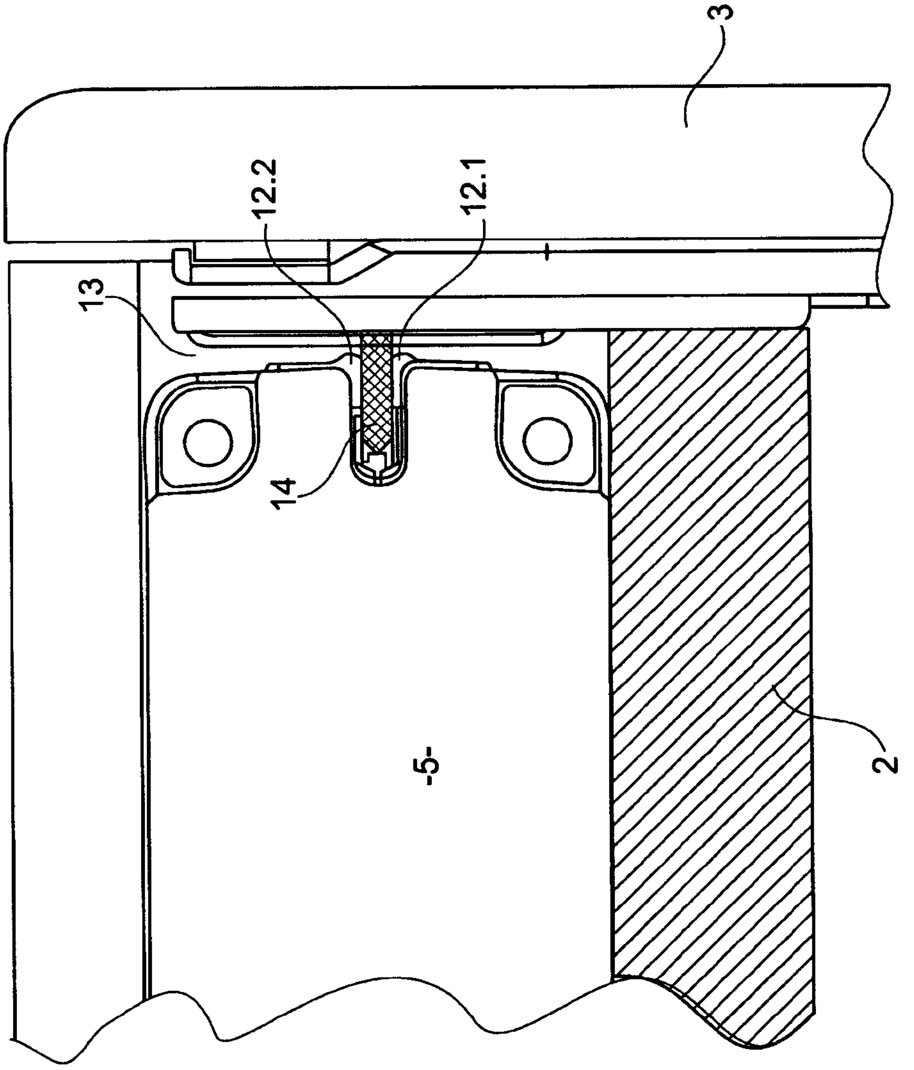
Figure 13:
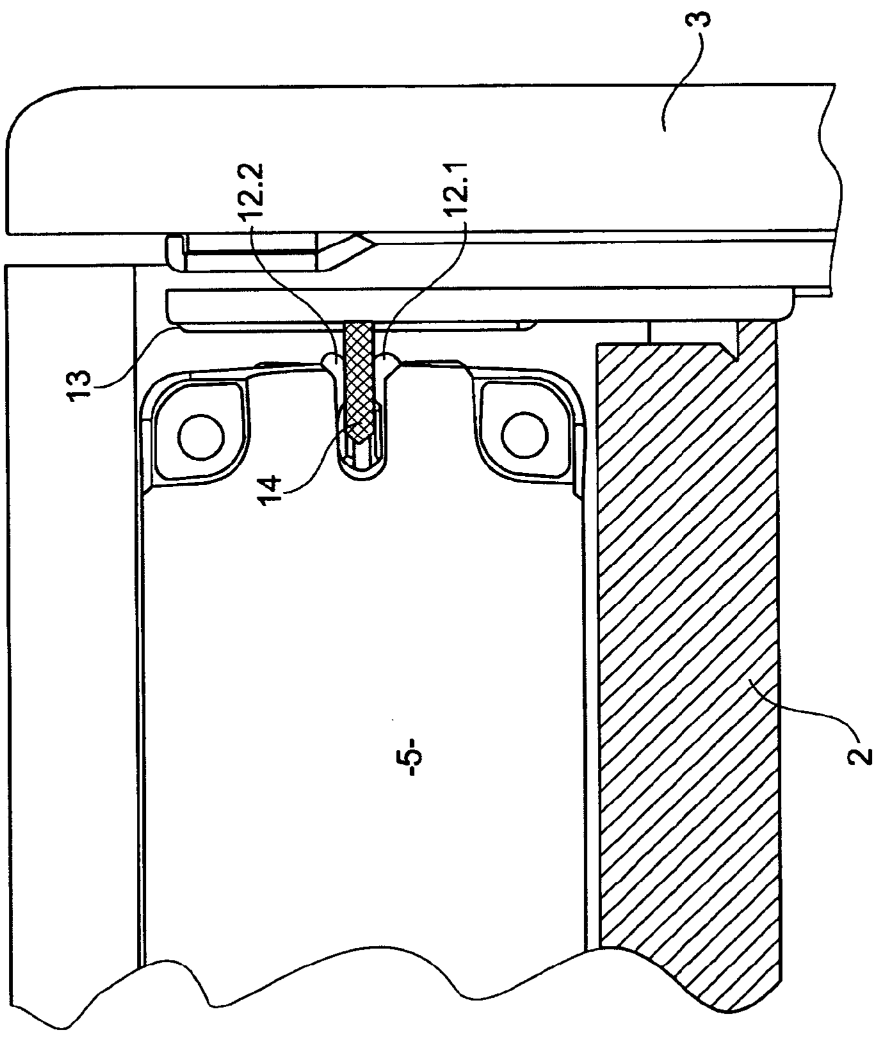
Figure 14:
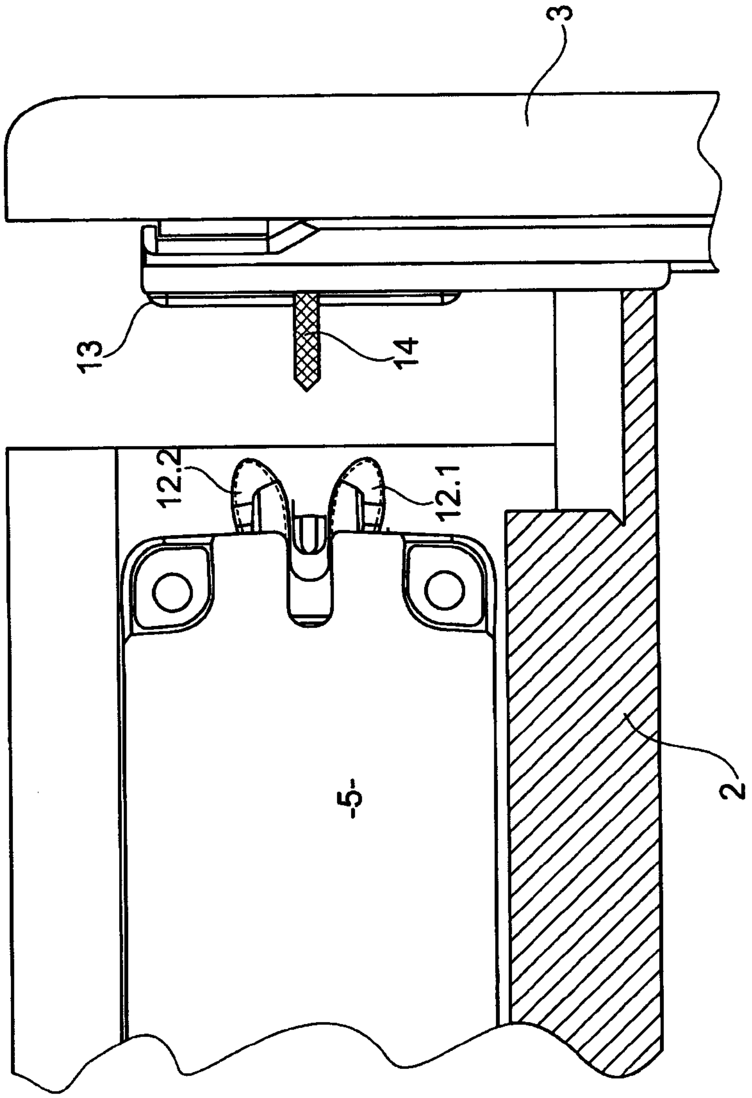
Figure 15A:
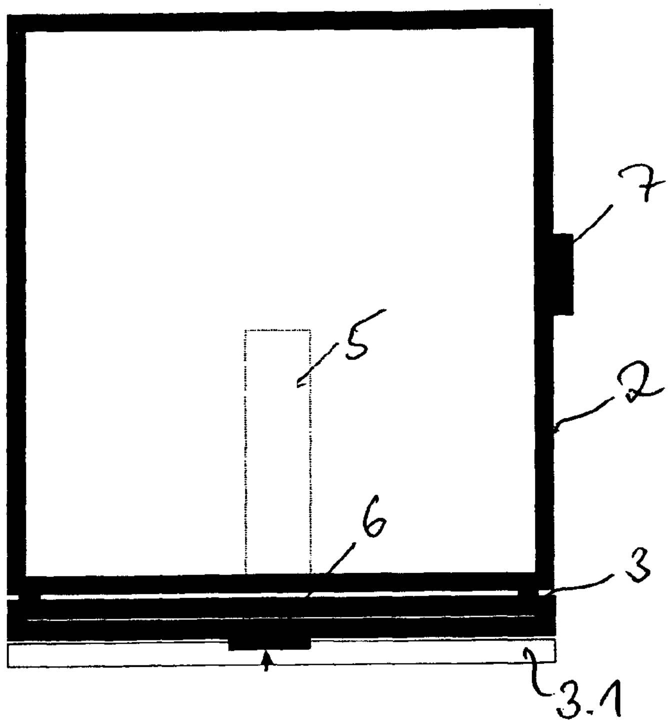
FIGS. 15*a*+*b* a plan view and a side view of an embodiment of a dishwasher with, adapted furniture front with an actuation device.
Figure 15B:
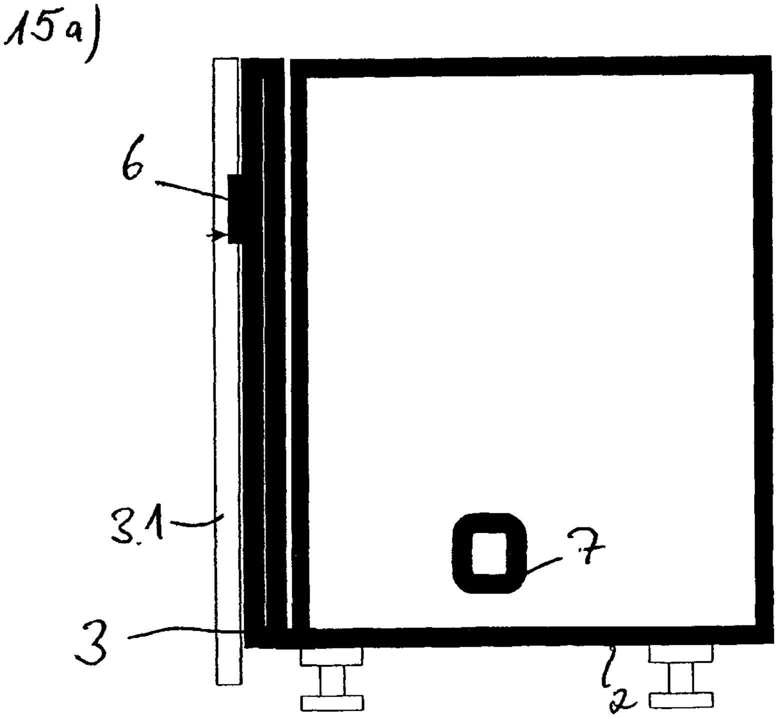
Figure 16:
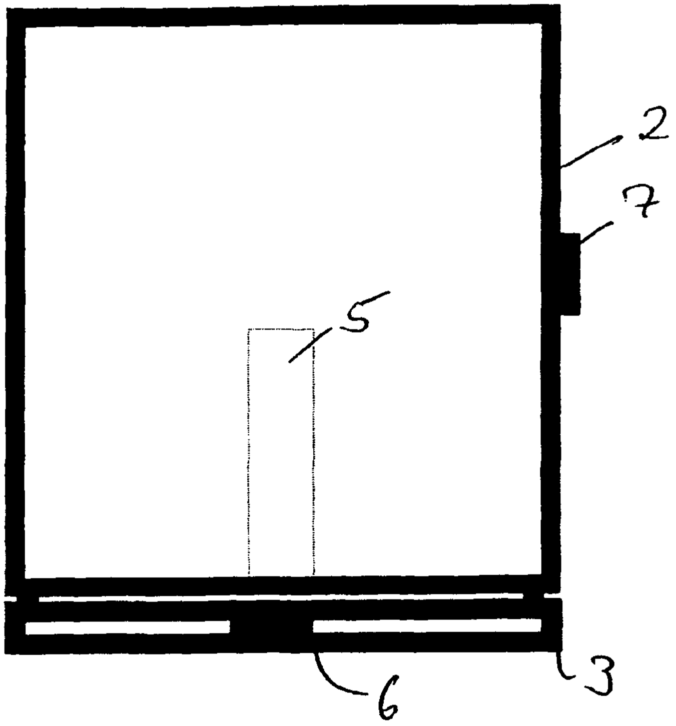
FIGS. 16*a*+*b* an analogous representation to FIGS. 15 *a*+*b* of a dishwasher without adapted furniture front.
Figure 16:
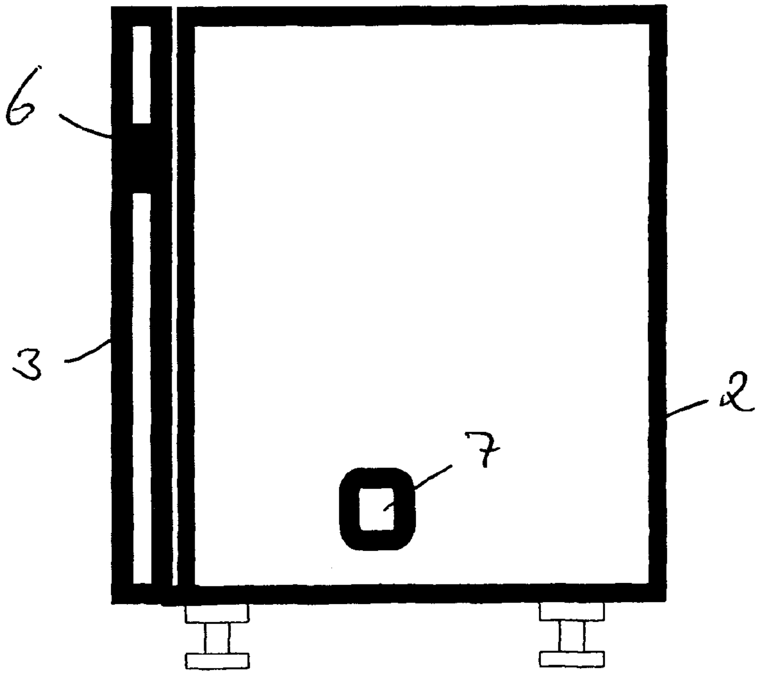
Figure 17A:
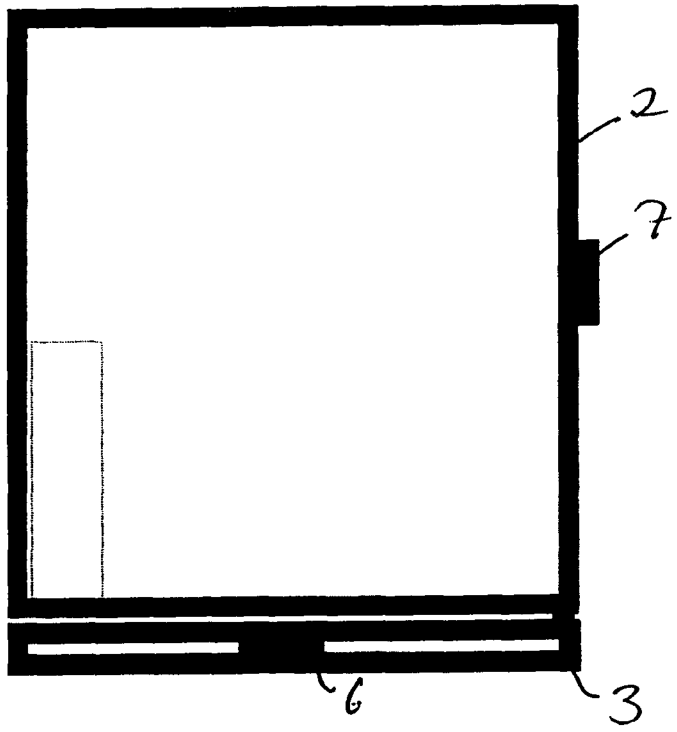
FIGS. 17*a*+*b* a plan view and a side view, respectively, of an embodiment of a refrigerator.
Figure 17B:
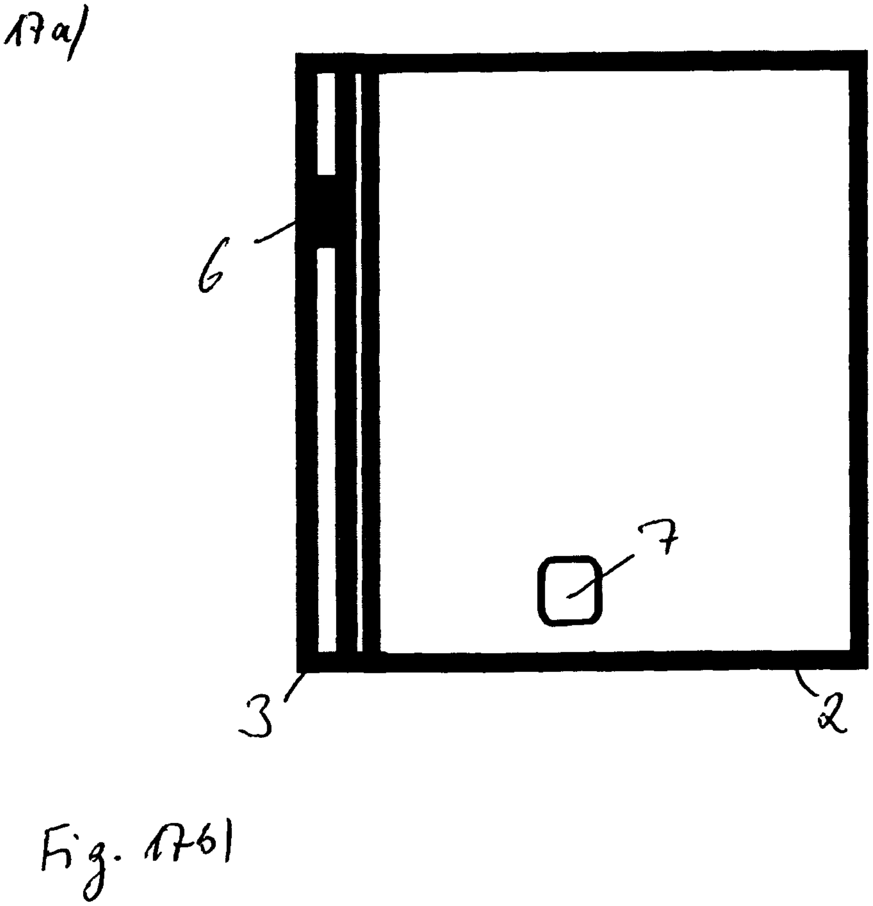
Figure 18A:
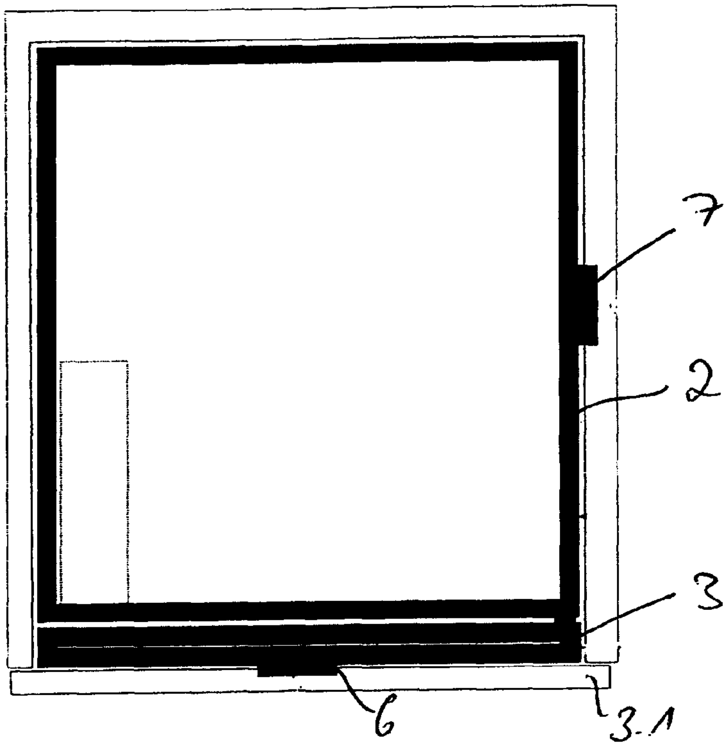
FIGS. 18*a*+*b* a plan view and a side view of a built-in refrigerator.
Figure 18B:
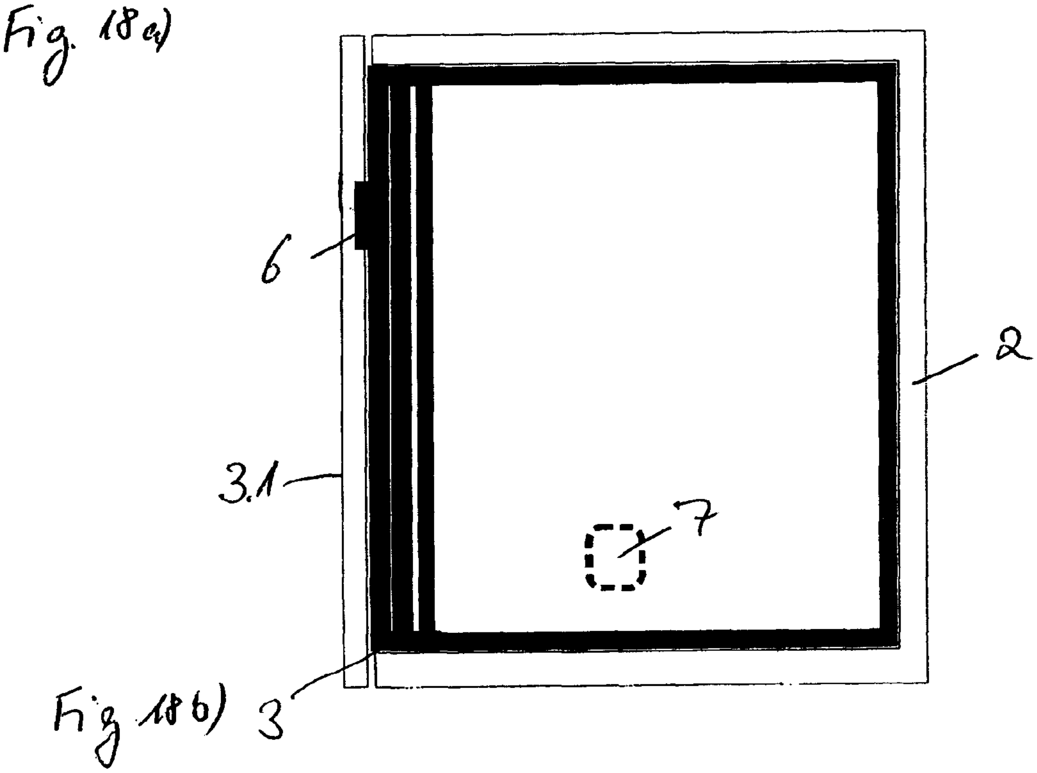
Figure 19A:
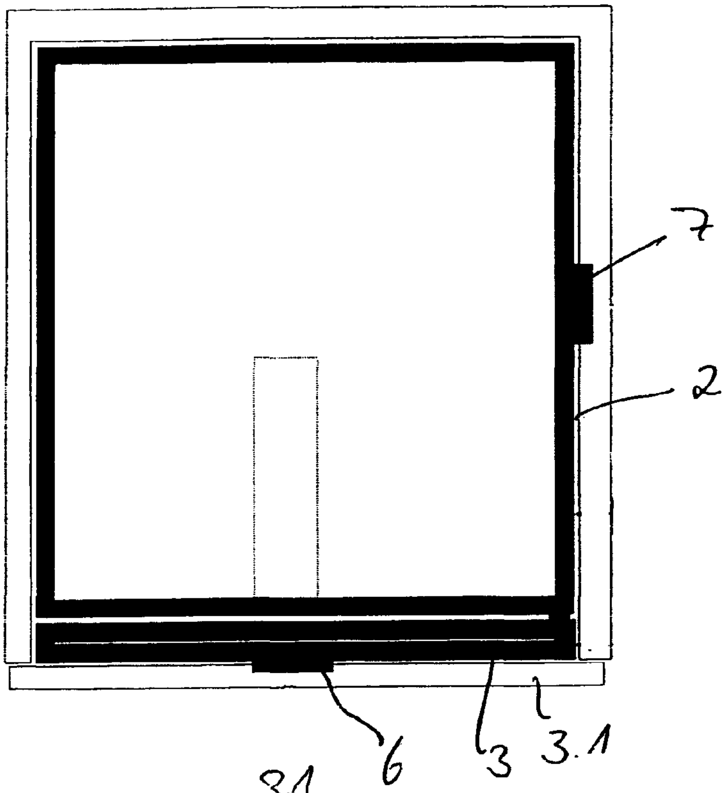
FIGS. 19*a*+*b* a plan view and a side view of an oven.
Figure 19B:
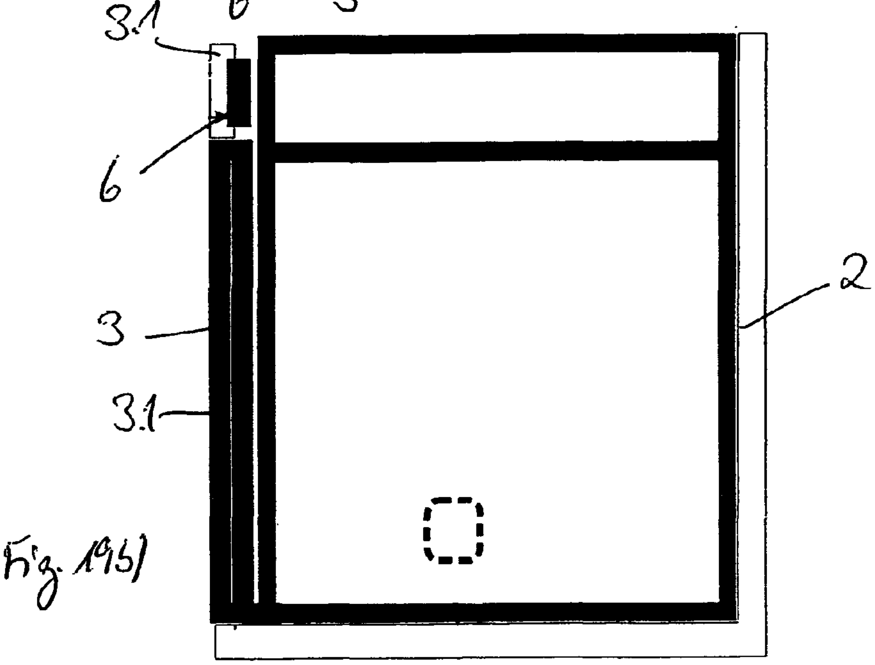
Figure 20A:
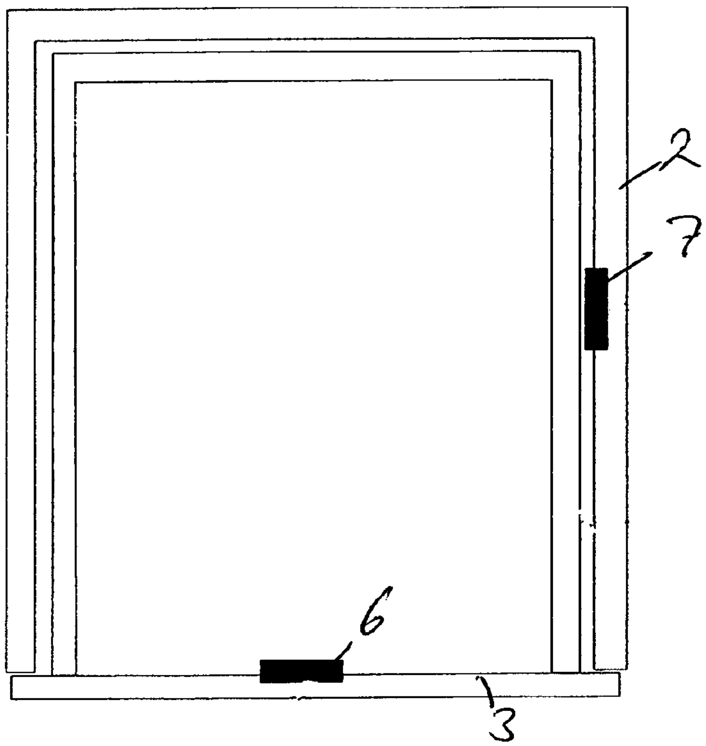
FIGS. 20*a*+*b* a cabinet with pull-out devices, in a plan view and in a side view, respectively.
Figure 20B:
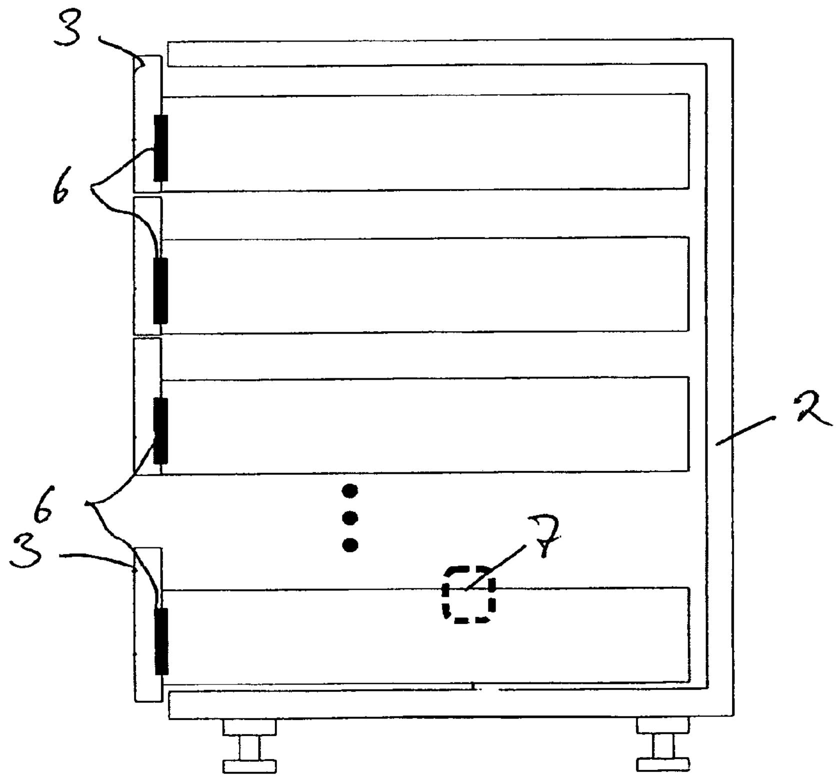
Figure 21A:
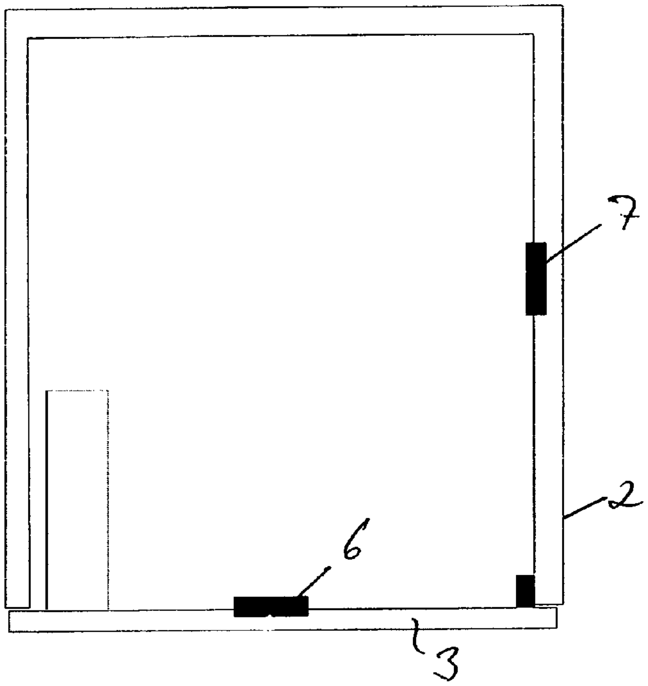
FIGS. 21*a*+*b* a cabinet with door, in a plan view and in a lateral view, respectively, and FIGS. 22*a*+*b* a top cabinet with door, in a plan view and in a side view, respectively.
Figure 21B:
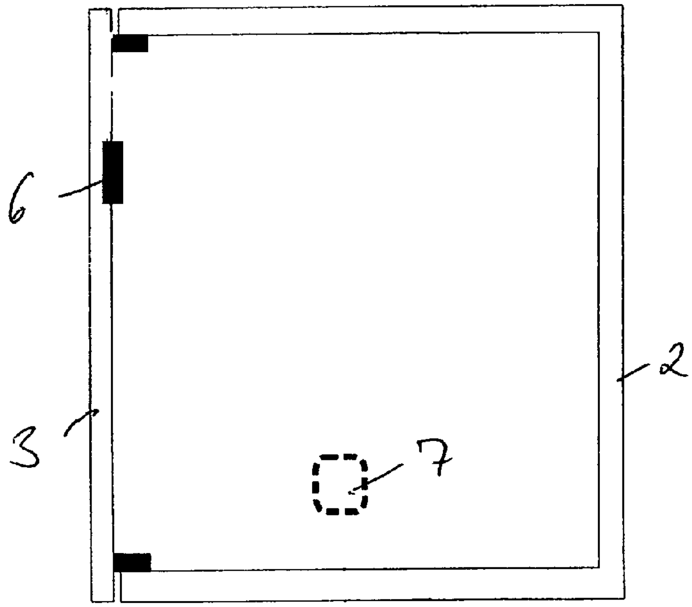
Figure 22A:
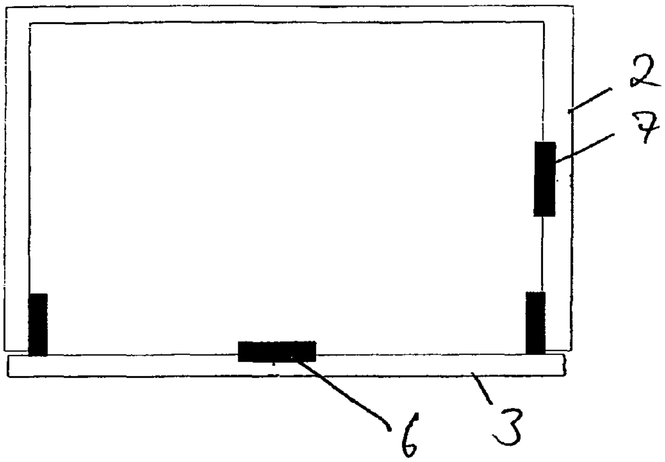
Figure 22B:
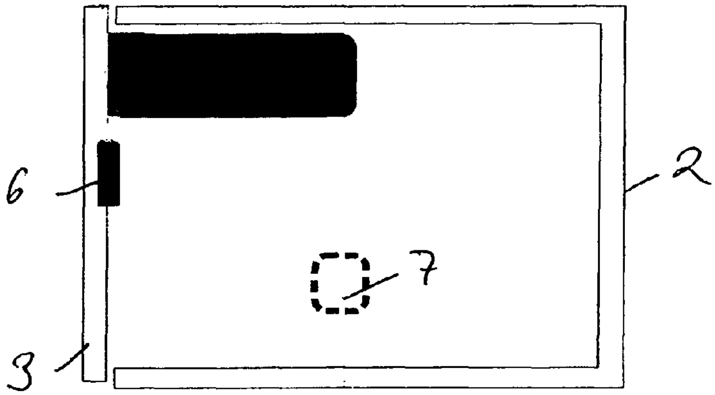

Contacting of this switching rod is illustrated in FIGS. 10 and 11, whereupon the fork claws 12.1, 12.2 with the adjusting means 11 are actuated such that the grip 13 is engaged and the front element 3 is pulled motorically for the purpose of elimination of slip into the final closed position. Then the front element 3 is decoupled again, so that the electric drive 5 releases the front element again, as shown in FIGS. 12 and 13 so that the front element 3 can be pulled out again by hand but can also be moved out motorically by means of the adjusting means by a knocking signal in the afore described way.

When the front element 3 is pulled out by hand, the control means ensure that the adjusting means 11 provided in the form of a toothed rack carries out an idle stroke and is returned into its starting position. Not shown in detail, a microphone can also be provided to determine airborne sound signals that are also supplied to the evaluation unit, not illustrated.

As a whole, a system is provided with which in a very comfortable way by a light knocking action on the front element 3 the front element 3 with pull-out device automatically opens by the motor drive 5 wherein, however, a high triggering reliability exists because of the two body sound signals 6 and 7, attached to the front element 3 and also, at a distance thereto and also with a different angular orientation, to the furniture corpus 2, respectively.

The actuation device is suitable for use with kitchen furniture, kitchen appliances, built-in kitchen appliances, office furniture, product dispensing devices and in ergonomics technology. As electrical kitchen appliances, for example, dishwashers, refrigerators, upright freezers, freezer chests, stoves, exhaust hoods, and microwave devices are conceivable where functional elements to be opened are to be opened by the actuation device by means of a knocking signal. As possible corpus body sound sensors, piezo elements are conceivable that may optionally be provided additionally with a seismic mass, strain gauges (SG) that also may be provided additionally with a seismic mass, acceleration sensors, mechanical vibration switches and the like.

In FIGS. 15 to 22 different devices or pieces of furniture are illustrated in an exemplary fashion in which an afore described actuation device may be used. They have in common, respectively, that the furniture corpus, i.e., a dishwasher corpus, a refrigerator corpus, a furniture corpus, an oven corpus, a cabinet corpus, a microwave corpus etc. is provided with a front element 3 that may be provided with an additional front plate, for example, a kitchen cabinet panel 3.1 (FIG. 15*a*). In the area of this front element 3 there is arranged the front body sound sensor 6 whose sound sensor is oriented perpendicularly to the transverse length of the front. The corpus body sound sensor 7 provided in the embodiment of FIGS. 15*a* and 15*b* is provided on the outer wall of the dishwasher corpus 2 with a body sound sensor orientation that is oriented perpendicular to or at a right angle to the sound orientation of the front sensor. By means of the control means, not shown in detail, the corresponding signals are detected and evaluated and a corresponding opening signal is supplied to the drive 5 so that in the embodiment according to FIGS. 15*a* and 16*b*, similar to the embodiment according to FIGS. 16*a* to 22*b* the suitable front elements can be pivoted downwardly or to the side.

What is claimed is:

1. An actuation device for pull-out element of a component having a corpus, wherein the pull-out element is moveable by a drive unit relative to the corpus, wherein the drive unit is activatable by control means and moveable into an open position, wherein the control means comprise a first sensor and a second sensor, wherein the first sensor is a front body sound sensor correlated with a front element of the pull-out element and the second sensor is a corpus body sound sensor that is arranged in or on the corpus at a spacing to the front body sound sensor, wherein the control means comprise an evaluation unit that carries out a signal comparison of body sound signals of the front body sound sensor and of body sound signals of the corpus body sound sensor with each other, wherein the drive unit is activatable as a function of a result of the signal comparison by the control means, wherein the corpus body sound sensor is arranged on a sidewall of the corpus body or on the drive unit and has a sensing orientation that is substantially transverse to a sensing orientation of the front body sound sensor and substantially parallel to a length extension of the front element.

2. The actuation device according to claim 1, wherein the front body sound sensor is arranged on the front element.

3. The actuation device according to claim 1, wherein sensor signals of the front body sound sensor and the corpus body sound sensor are transmitted wirelessly to the control means.

4. The actuation device according to claim 3, wherein the control means have a radio transmitter for transmitting an evaluation signal based on the result of the signal comparison to the drive unit.

5. The actuation device according to claim 1, wherein the evaluation unit compares the body sound signals received from the front body sound sensor and the corpus body sound sensor based on a sound level of the body sound signals.

6. The actuation device according to claim 1, comprising a further control sensor sup an additional control signal to the evaluation unit.

7. The actuation device according to claim 1, comprising a biometric device that recognizes biometric data of an operator and is arranged on the front element, wherein the biometric are supplied to the evaluation unit.

8. The actuation device according to claim 1, wherein the drive unit has extendable and retractable adjusting means that are coupled detachably to the front element.

9. The actuation device according to claim 8, wherein the extendable and retractable adjusting means is a toothed rack element.

10. The actuation device according to claim 8, wherein the extendable and retractable adjusting means comprises a coupling member detachably attached to the front element, wherein the coupling member, after the front element has been moved into a final open position, is detached from the front element and returned by the drive unit into a retracted starting position.

11. The actuation device according to claim 1, wherein the front element is moved by the drive it into an open position and manually into a closed position.

12. The actuation device according to claim 11, wherein, during the course of a closing movement, the front element is coupled again, starting at a preselectable closing travel, with the extendable and retractable adjusting means and the final closing movement is performed by the drive unit and the extendable and retractable adjusting means.

13. The actuation device according to claim 8, wherein the extendable and retractable adjusting means has at a first and a coupling member with openable and closeable fork claws correlated with one another, wherein a grip element is connected to a back of the front element and is adapted to interact with the coupling member.

14. The actuation device according to claim 13, comprising an actuator connected to a back of the front element, wherein the drive unit comprises a movable triggering unit that is moveable during the course of a closing movement of the front element by the actuator from a waiting position into a switching position, wherein in the switching position the coupling member of the extendable and retractable adjusting means engages the front element and the drive unit moves the front element into a final closed position.

15. The actuation device according to claim 1, wherein, after reaching the final open position of the front element, the control means releases the connection between the extendable and retractable adjusting means and the front element, the drive unit moves the extendable and retractable adjusting means into a final position and, after reaching the final position, the drive means moves the extendable and retractable adjusting means into a waiting position.

16. The actuation device according to claim 1, wherein the first and second sensors are piezo elements.

17. The actuation device according to claim 16, wherein the piezo elements are provided with an additional seismic mass.

18. The actuation device according to claim 1, wherein the first and second sensors are strain gauges.

19. The actuation device according to claim 1, wherein the first and second sensors are acceleration sensors.

20. The actuation device according to claim 1, wherein the first and second sensors mechanical vibration switches.

21. A piece of furniture equipped with an actuation device according to claim 1.

22. A kitchen appliance equipped with an actuation device according to claim 1.

* * * * *